US012722997B2

(12) United States Patent
Tokumitsu et al.

(10) Patent No.: US 12,722,997 B2
(45) **Date of Patent: *Sep. 1, 2026**

(54) GLASS FOR MAGNETIC RECORDING MEDIUM SUBSTRATE OR FOR GLASS SPACER TO BE USED IN MAGNETIC RECORDING/REPRODUCING DEVICE, MAGNETIC RECORDING MEDIUM SUBSTRATE, MAGNETIC RECORDING MEDIUM, GLASS SPACER TO BE USED IN MAGNETIC RECORDING/REPRODUCING DEVICE, AND MAGNETIC RECORDING/REPRODUCING DEVICE

(71) Applicant: HOYA CORPORATION, Tokyo (JP)

(72) Inventors: Shuzo Tokumitsu, Tokyo (JP); Kazuaki Hashimoto, Tokyo (JP)

(73) Assignee: HOYA CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/548,890

(22) PCT Filed: Mar. 4, 2022

(86) PCT No.: PCT/JP2022/009537

§ 371 (c)(1),
(2) Date: Sep. 1, 2023

(87) PCT Pub. No.: WO2022/186393

PCT Pub. Date: Sep. 9, 2022

(65) Prior Publication Data

US 2024/0158281 A1 May 16, 2024

Related U.S. Application Data

(60) Provisional application No. 63/157,134, filed on Mar. 5, 2021.

(30) Foreign Application Priority Data

Sep. 30, 2021 (JP) ................................ 2021-160707

(51) Int. Cl.
*C03C 3/085* (2006.01)
*C03C 3/091* (2006.01)
*C03C 3/095* (2006.01)
*G11B 5/73* (2006.01)

(52) U.S. Cl.
CPC .............. *C03C 3/085* (2013.01); *C03C 3/091* (2013.01); *C03C 3/095* (2013.01); *G11B 5/73921* (2019.05)

(58) Field of Classification Search
None
See application file for complete search history.

(56) References Cited

U.S. PATENT DOCUMENTS

| | | | | |
|---|---|---|---|---|
| 11,081,133 | B2 | 8/2021 | Sato et al. | |
| 11,688,424 | B2 | 6/2023 | Sato et al. | |
| 2003/0109370 | A1 | 6/2003 | Ikenishi et al. | |
| 2011/0123832 | A1 | 5/2011 | Matsumoto et al. | |
| 2013/0231236 | A1 | 9/2013 | Kawai et al. | |
| 2013/0343166 | A1 | 12/2013 | Matsumoto et al. | |
| 2014/0036644 | A1 | 2/2014 | Matsumoto et al. | |
| 2014/0334276 | A1 | 11/2014 | Matsumoto et al. | |
| 2019/0362754 | A1* | 11/2019 | Sato | C03C 3/085 |
| 2021/0221729 | A1* | 7/2021 | Sato | G11B 5/73921 |
| 2025/0140290 | A1 | 5/2025 | Sato et al. | |

FOREIGN PATENT DOCUMENTS

| | | | | |
|---|---|---|---|---|
| CN | 109923083 A | 6/2019 | | |
| EP | 0858974 A1 | 8/1998 | | |
| JP | 2000-063144 A | 2/2000 | | |
| JP | 2002-358626 A | 12/2002 | | |
| JP | 2015-024954 A | 2/2015 | | |
| WO | 2011/019010 A1 | 2/2011 | | |
| WO | 2012/001914 A1 | 1/2012 | | |
| WO | 2013/172247 A1 | 11/2013 | | |
| WO | 2015/029902 A1 | 3/2015 | | |
| WO | 2018/088563 A1 | 5/2018 | | |
| WO | WO-2018225725 A1 * | 12/2018 | C03C 3/087 | |
| WO | WO-2019221102 A1 * | 11/2019 | C03C 3/078 | |
| WO | 2021/015240 A1 | 1/2021 | | |

OTHER PUBLICATIONS

Translation of the International Search Report mailed on May 17, 2022.

* cited by examiner

*Primary Examiner* — Holly Rickman
*Assistant Examiner* — Lisa Chau
(74) *Attorney, Agent, or Firm* — Spencer Fane LLP

(57) ABSTRACT

Provided is a glass for a magnetic recording medium substrate or for a glass spacer for a magnetic recording/reproducing device, the glass being an amorphous glass that contains at least $Li_2O$, in which a total content of $Na_2O$ and $K_2O$ is 0 mol % or more and 6.0 mol % or less, a $B_2O_3$ content is 0 mol % or more and 10.0 mol % or less, and a CaO content is 0 mol % or more and 1.0 mol % or less.

19 Claims, No Drawings

GLASS FOR MAGNETIC RECORDING MEDIUM SUBSTRATE OR FOR GLASS SPACER TO BE USED IN MAGNETIC RECORDING/REPRODUCING DEVICE, MAGNETIC RECORDING MEDIUM SUBSTRATE, MAGNETIC RECORDING MEDIUM, GLASS SPACER TO BE USED IN MAGNETIC RECORDING/REPRODUCING DEVICE, AND MAGNETIC RECORDING/REPRODUCING DEVICE

CROSS-REFERENCE TO RELATED APPLICATIONS

This U.S. National stage application of International Patent Application No. PCT/JP2022/009537, filed on Mar. 4, 2022, which, in turn, claims priority to U.S. Provisional Patent Application No. 63/157,134, filed on Mar. 5, 2021 and Japanese Patent Application No. 2021-160707, filed in Japan on Sep. 30, 2021. The entire contents of U.S. Provisional Patent Application No. 63/157,134, Japanese Patent Application No. 2021-160707, and International Patent Application No. PCT/JP2022/009537 are hereby incorporated herein by reference.

BACKGROUND

Field of the Invention

The present invention relates to a glass for a magnetic recording medium substrate or for a glass spacer for a magnetic recording/reproducing device, as well as a magnetic recording medium substrate, a magnetic recording medium, a glass spacer for a magnetic recording/reproducing device, and a magnetic recording/reproducing device.

Background Information

Heretofore, a substrate made from an aluminum alloy was used for a substrate for a magnetic recording medium such as a hard disk (magnetic recording medium substrate). However, drawbacks such as susceptibility to deformation have been pointed out for a substrate made of an aluminum alloy. Therefore, nowadays, magnetic recording medium substrates made of glass are widely used (for example, see JP 2002-358626A).

SUMMARY

There is desire for glass for a magnetic recording medium substrate to have high rigidity. This is because of the following reasons.

A magnetic recording medium is usually installed inside a hard disk drive (HDD) incorporated in a device such as a personal computer. In an HDD, a plurality of magnetic recording media (magnetic disks) are attached to the rotation shaft of a spindle motor, and data is written on or read from magnetic recording layers of the magnetic recording media that are rotated at a high speed inside the HDD by an actuator incorporated in the HDD. Large vibrations of a magnetic recording medium when the magnetic recording medium is rotated at a high speed in order to write or read data may result in a head crash, which is a collision between the magnetic head and the magnetic recording medium surface. The storage capacity of an HDD can be increased by reducing the thickness of each magnetic recording medium and installing a larger number of magnetic recording media in the HDD. However, in general, as the thickness of the substrate is reduced in order to reduce the thickness of the magnetic recording medium, the magnetic recording medium tends to vibrate more easily during high-speed rotation. In order to suppress such vibration, it is desirable for the glass substrate of a magnetic recording medium to be a glass substrate that has high rigidity and is unlikely to vibrate during high-speed rotation even when the thickness of the glass substrate is reduced.

In view of the above, an aspect of the present invention aims to provide a high-rigidity glass for a magnetic recording medium substrate.

An aspect of the present invention relates to a glass for a magnetic recording medium substrate or for a glass spacer for a magnetic recording/reproducing device, the glass being an amorphous glass containing:

at least $Li_2O$, in which a total content of $Na_2O$ and $K_2O$ is 0 mol % or more and 6.0 mol % or less, a $B_2O_3$ content is 0 mol % or more and 10.0 mol % or less, and a CaO content is 0 mol % or more and 1.0 mol % or less.

According to an aspect of the present invention, it is possible to provide a high-rigidity glass for a magnetic recording medium substrate or for a glass spacer for a magnetic recording/reproducing device. Furthermore, according to an aspect, it is also possible to provide a magnetic recording medium substrate made of the above glass, and a magnetic recording medium that includes this magnetic recording medium substrate. Also, according to an aspect, it is possible to provide a glass spacer for a magnetic recording apparatus made of the above glass. Furthermore, according to an aspect, it is possible to provide a magnetic recording/reproducing device.

DETAILED DESCRIPTION OF THE EMBODIMENTS

[Glass]

The above-described glass can be a glass for a magnetic recording medium substrate or a glass for a glass spacer for a magnetic recording/reproducing device, and can be an amorphous glass. Amorphous glass refers to glass that, unlike crystallized glass, substantially does not contain a crystal phase and exhibits a glass transition phenomenon in response to an increase in temperature. Also, the process for manufacturing crystallized glass is complicated. Furthermore, with crystallized glass, it is not easy to achieve high smoothness required for a magnetic recording medium substrate.

Furthermore, the above-described glass may be an amorphous oxide glass. Oxide glass is glass in which the main network-forming component is an oxide.

Hereinafter, the above-described glass will be described in more detail.

A glass composition is denoted by a glass composition based on oxides in the present invention and in this specification. Here, a “glass composition based on oxides” means a glass composition obtained by performing conversion such that all raw glass materials are decomposed in melting and are present as oxides in the glass. The glass composition is denoted on the basis of mole (mol %, mole ratio), unless otherwise specified.

The glass composition in the present invention and this specification can be obtained by, for example, a method such as ICP-AES (Inductively Coupled Plasma-Atomic Emission Spectrometry). ICP-AES is used for quantitative analysis, and the analysis is performed for each of elements. Then, analysis values are converted into expressions based on oxides. Analysis values by means of ICP-AES may include, for example, a measurement error of approximately ±5% of an analysis value. Thus, a value based on oxide expression converted from an analysis value may also include an error of approximately ±5%.

Moreover, in the present invention and this specification, the fact that a constituent component is 0% in content, or is not contained or not introduced denotes that the constituent component is substantially not contained, and that the content of the constituent component is at approximately equal to or less than a level of impurities. "Approximately equal to or less than a level of impurities" means, for example, less than 0.01%.

<Glass Composition>

The glass contains $Li_2O$ as an essential component and CaO in a small amount of 0% or more and 1.0% or less, and the total content of $Na_2O$ and $K_2O$, which are other alkali metal oxides, is 0% or more and 6.0% or less, and the $B_2O_3$ content is 0% or more and 10.0% or less. Such composition of the glass may contribute to the ability of the glass to exhibit high rigidity.

The CaO content in the glass is 1.0% or less. A CaO content of 1.0% or less contributes to improving the rigidity of glass and may also contribute to improving the thermal stability of the glass. From these viewpoints, the CaO content is preferably 0.9% or less, and more preferably 0.8% or less, 0.7% or less, 0.6% or less, 0.5% or less, 0.4% or less, 0.3% or less, 0.2% or less, or 0.1% or less in order of increasing preference, and can be 0%. It is further preferable that the glass does not contain CaO.

The glass contains $Li_2O$ as an essential component, and the total content of $Na_2O$ and $K_2O$ ($Na_2O+K_2O$), which are other alkali metal oxides, is 0% or more and 6.0% or less. This may also contribute to improving the rigidity of glass. From the viewpoint of further increasing the rigidity of glass, the total content of $Na_2O$ and $K_2O$ ($Na_2O+K_2O$) is preferably 0.5% or less, and more preferably 4.0% or less, 3.0% or less, 2.0% or less, 1.0% or less, 0.5% or less, or 0.1% or less in order of increasing preference, and can be 0%. It is further preferable that the glass does not contain $Na_2O$ or $K_2O$, and it is even more preferable that the glass does not contain any alkali metal oxides other than $Li_2O$.

The $Li_2O$ content in the glass is over 0%, and from the viewpoint of improving thermal stability, is preferably 1.0% or more, more preferably 2.0% or more, and even more preferably 3.0% or more. The above range of the $Li_2O$ content is preferable from the viewpoint of maintaining the temperature required for melting the glass in an appropriate range as well. The temperature required for melting glass is preferably maintained in an appropriate range from the viewpoint of extending the service life of a melting furnace and reducing costs through a reduction in the input energy. On the other hand, from the viewpoint of further improving the rigidity of glass and further improving devitrification resistance and/or from the viewpoint of increasing the glass transition temperature, the $Li_2O$ content is preferably 10.0% or less, and more preferably 9.0% or less, 8.0% or less, 7.0% or less, 6.0% or less, 5.0% or less, or 4.0% or less in order of increasing preference.

From the viewpoint of improving rigidity, the $B_2O_3$ content in the glass is 10.0% or less, preferably 9.0% or less, and more preferably 8.0% or less, 7.0% or less, 6.0% or less, 5.0% or less, 4.0% or less, 3.0% or less, 2.0% or less, 1.0% or less, or 0.5% or less in order of increasing preference. The $B_2O_3$ content in the glass is 0% or more, and from the viewpoint of improving impact resistance and thermal stability, is preferably 0.1% or more, and more preferably 0.2% or more. A glass having high impact resistance is preferable because cracks and chipping are less likely to occur in processes such as cutting and grinding. Also, a glass having high thermal stability is preferable because such a glass is unlikely to devitrify.

In an embodiment, the glass can contain one or both of $SiO_2$ and $Al_2O_3$.

From the viewpoint of improving chemical durability, the $SiO_2$ content in the glass is preferably 50.0% or more, and more preferably 51.0% or more, 52.0% or more, 53.0% or more, 54.0% or more, or 55.0% or more in order of increasing preference. A glass having high chemical durability is preferable because surface roughness is less likely to form during polishing or cleaning. On the other hand, from the viewpoint of further improving rigidity, the $SiO_2$ content is preferably 70.0% or less, and further preferably 69.0% or less, 68.0% or less, 67.0% or less, 66.0% or less, 65.0% or less, 64.0% or less, or 63.0% or less in order of increasing preference.

From the viewpoint of improving thermal stability, the $Al_2O_3$ content in the glass is preferably 20.0% or less, and more preferably 19.0% or less, 18.0% or less, 17.0% or less, 16.0% or less, 15.0% or less, or 14.0% or less in order of increasing preference. The above range of the $Al_2O_3$ content is preferable from the viewpoint of maintaining the temperature required for melting the glass in an appropriate range as well. On the other hand, from the viewpoint of further improving rigidity, the $Al_2O_3$ content is preferably 10.0% or more, and more preferably 11.0% or more.

With regard to alkaline earth metal oxides, the CaO content in the glass is as described above. In an embodiment, the glass can contain one or more types of alkaline earth metal oxides. Specific examples of the alkaline earth metal oxides contained in the glass include MgO, SrO, and BaO. In an embodiment, the glass can contain MgO. From the viewpoint of further improving rigidity, the MgO content in the glass is preferably 10.0% or more, and more preferably 11.0% or more and 12.0% or more in order of increasing preference. From the viewpoint of further improving devitrification resistance of the glass, the MgO content is preferably 28.0% or less, and more preferably 27.0% or less, 26.0% or less, 25.0% or less, 24.0% or less, 23.0% or less, 22.0% or less, 21.0% or less, 20.0% or less, 19.0% or less, or 18.0% or less in order of increasing preference.

The $Fe_2O_3$ content in the glass expressed as an outer percentage may be 1 mol % or less, 0.7 mol % or less, 0.5 mol % or less, 0.4 mol % or less, 0.3 mol % or less, 0.1 mol % or less, 0.07 mol % or less, 0.05 mol % or less, 0.04 mol % or less, 0.03 mol % or less, or 0.02 mol % or less. Note that the $Fe_2O_3$ content is expressed as an outer percentage. That is, the $Fe_2O_3$ content is represented by a mole percentage of the amount of $Fe_2O_3$ contained in the glass with respect to 100% where the total content of the glass components other than $Fe_2O_3$ (the total content of the glass components and additives when the glass contains additives in addition to the glass components) is 100%. In an embodiment, the glass may contain no Fe (the $Fe_2O_3$ content of the above-described glass expressed as the outer percentage may be 0 mol %).

The glass may also contain one or more types of metal selected from the group consisting of Zr, Y, La, Ti, Hf, Cu, Co, Mn, Nd, Pr, Nb, V, Cr, Ni, Mo, Ho, and Er or an oxide thereof, and may contain none of them. When a glass composition based on oxides contains an oxide of one or more types of metals selected from the group consisting of Zr, Y, La, Ti, Hf, Cu, Co, Mn, Nd, Pr, Nb, V, Cr, Ni, Mo, Ho, and Er, the thermal stability of the glass tends to increase. In an embodiment, the content of an oxide of one or more types of metals selected from the group consisting of Zr, Y, La, Ti, Hf, Cu, Co, Mn, Nd, Pr, Nb, V, Cr, Ni, Mo, Ho, and Er (the total content thereof when multiple types of metals are contained) may be 0%, 0% or more or over 0%, and 5.0% or less, 4.0% or less, 3.0% or less, 2.0% or less, 1.0% or less, 0.5% or less, or 0.1% or less. The $Y_2O_3$ content may be 0% or more or over 0%, and 3.0% or less, 2.0% or less, or 1.0% or less, for example. The $TiO_2$ content may be 0% or more or over 0%, and 3.0% or less, 2.0% or less, or 1.0% or less. In an embodiment, the glass can contain one or both of $Y_2O_3$ and $TiO_2$.

F is a component that easily volatilizes when glass melts and also causes striae, and thus it is preferable that the above-described glass does not contain F. It is preferable that the glass does not contain F from the viewpoint of suppressing erosion of a melting furnace, suppressing a decrease in the Young's modulus, and suppressing a decrease in the specific elastic modulus as well.

Pb, Cd, and As are substances that adversely affect the environment, and thus the introduction of these substances is preferably avoided.

From the viewpoint of obtaining a clarifying effect, the glass may contain at least one selected from the group consisting of $SnO_2$, $CeO_2$, and $Sb_2O_3$. In an embodiment, the total content of $SnO_2$ and $CeO_2$ may be 0%. In another embodiment, the glass may contain $SnO_2$ and/or $CeO_2$, and the total content of $SnO_2$ and $CeO_2$ ($SnO_2$+$CeO_2$) is preferably in the range of 0.05% to 2%. When the total content of $SnO_2$ and $CeO_2$ is 0.05% or more, a sufficient clarifying effect can be obtained, and residual bubbles can be reduced. Also, when the total content ($SnO_2$ and $CeO_2$) is 2% or less, during melting of glass, lowering of productivity by the blow-up of molten glass can be prevented. The lower limit of the total content ($SnO_2$+$CeO_2$) is preferably 0.10% or more, more preferably 0.20% or more, even more preferably 0.25% or more, further preferably 0.30% or more, still more preferably 0.35% or more, and yet more preferably 0.40% or more. Also, the upper limit of the total content ($SnO_2$+$CeO_2$) is preferably 1.5% or less, more preferably 1.2% or less, even more preferably 1.0% or less, further preferably 0.70% or less, still more preferably 0.65% or less, yet more preferably 0.60% or less, further more preferably 0.55% or less, and still further preferably 0.50% or less.

$SnO_2$ serves to promote clarification in a state where the melting temperature of glass is comparatively high (a temperature range of approximately 1400° C. to 1600° C.). In a circumstance where the use of a clarifying agent that adversely affects the environment, such as $Sb_2O_3$ or arsenious acid, is limited, in an embodiment, the introduction of $SnO_2$ into the glass is preferable for removing bubbles in glass having a high melting temperature. From the viewpoint of obtaining a clarifying effect, the content of $SnO_2$ is preferably 0.01% or more, more preferably 0.05% or more, even more preferably 0.10% or more, further preferably 0.15% or more, and still more preferably 0.20% or more. Also, the content of $SnO_2$ is preferably 2% or less, more preferably 1.5% or less, even more preferably 1.0% or less, further preferably 0.8% or less, and still more preferably 0.5% or less.

$CeO_2$ is a component that exhibits a glass clarification action as is the case for $SnO_2$. $CeO_2$ serves to take in oxygen and fix it as a glass component in a state where the melting temperature of glass is comparatively low (a temperature range approximately from 1200° C. to 1400° C.), and, in an embodiment, it is preferable to introduce $CeO_2$ into the glass as a clarifying agent. From the viewpoint of obtaining a clarifying effect, the content of $CeO_2$ is preferably 0.01% or more, more preferably 0.05% or more, even more preferably 0.08% or more, and further preferably 0.10% or more. Also, the content of $CeO_2$ is preferably 2% or less, more preferably 1.5% or less, even more preferably 1.0% or less, further preferably 0.8% or less, still more preferably 0.5% or less, and yet more preferably 0.3% or less. When $SnO_2$ and $CeO_2$ are allowed to coexist, a clarification action in a wide temperature range can be obtained, and thus, in an embodiment, the glass preferably contains both $SnO_2$ and $CeO_2$.

From the viewpoint of reducing environmental burdens, it is desirable to refrain from using $Sb_2O_3$. The content of $Sb_2O_3$ in the glass is preferably in the range of 0% to 0.5%. The content of $Sb_2O_3$ is more preferably 0.3% or less, even more preferably 0.1% or less, further preferably 0.05% or less, and still more preferably 0.02% or less, and particularly preferably $Sb_2O_3$ is not contained.

The glass can be produced by weighing and blending raw glass materials such as oxides, carbonates, nitrates, sulfates, and hydroxides so as to give a predetermined glass composition, by sufficiently mixing these materials, heating and melting the mixture within a range of, for example, 1400° C. to 1600° C. in a melting vessel, and by molding homogenized molten glass that has been subjected to clarification and stirring to cause sufficient bubble separation. It is preferable to heat and melt raw glass materials in a melting tank at 1400° C. to 1550° C., to raise the temperature of the obtained molten glass in a clarification tank and keep the glass at 1450° C. to 1600° C., and after that to lower the temperature and cause glass to flow out at 1200° C. to 1400° C. to be molded, for example.

<Glass Physical Properties>

As a result of performing the above-described composition adjustment, the glass can have various glass physical properties described below.

(Specific Elastic Modulus)

The glass may have high rigidity due to having the composition mentioned above. One example of an indicator related to the rigidity of glass is the specific elastic modulus. The specific elastic modulus is calculated by dividing the Young's modulus of glass by the density thereof. Here, density can be considered as a value obtained by giving the unit $g/cm^3$ to the specific gravity of glass. The specific elastic modulus of the glass is preferably 35.0 MNm/kg or more, and even more preferably 35.5 MNm/kg or more, 36.0 MNm/kg or more, 36.5 MNm/kg or more, 37.0 MNm/kg or more, 37.5 MNm/kg or more, or 38.0 MNm/kg or more in order of increasing preference. The specific elastic modulus may be, for example, 45.0 MNm/kg or less, 44.0 MNm/kg or less, 43.0 MNm/kg or less, 42.0 MNm/kg or less, 41.0 MNm/kg or less, or 40.0 MNm/kg or less. However, a higher specific elastic modulus is more preferable because rigidity becomes higher, and thus the specific elastic modulus of the glass is not limited to the above-mentioned values.

(Young's Modulus E)

One example of an indicator related to the rigidity of glass is the Young's modulus. The Young's modulus of the glass is preferably 86.0 GPa or more, more preferably 87.0 GPa or more, and even more preferably 88.0 GPa or more, 89.0 GPa or more, 90.0 GPa or more, 91.0 GPa or more, 92.0 GPa or more, 93.0 GPa or more, 94.0 GPa or more, and 95.0 GPa or more in order of increasing preference. The Young's modulus of the glass may be 120.0 GPa or less or 110.0 GPa or less, for example. However, a higher Young's modulus means higher rigidity, which is more preferable, and thus the Young's modulus of the glass is not limited to the above-mentioned values.

(Specific Gravity d)

Reducing the specific gravity of a glass for a magnetic recording medium substrate makes it possible to reduce the weight of a magnetic recording medium substrate and furthermore the weight of a magnetic recording medium, and consequently enables suppression of the power consumption of an HDD. The specific gravity of the glass is preferably 2.80 or less, more preferably 2.75 or less, even more preferably 2.70 or less, further preferably 2.65 or less, and still more preferably 2.60. The specific gravity of the glass is 2.40 or more, for example. However, a lower specific gravity is preferable, and thus the specific gravity of the glass is not limited to the above-mentioned values.

(Glass Transition Temperature Tg)

Magnetic recording medium substrates are usually subjected to high temperature treatment in a step for forming a magnetic recording layer on a substrate. In order to form a magnetic recording layer containing a magnetic material with high magnetic anisotropy energy, which has been developed recently for high-density recording with a magnetic recording medium for example, usually, film formation is performed at a high temperature, or heat treatment is performed at a high temperature after film formation. It is preferable that a magnetic recording medium substrate has heat resistance capable of withstanding such high temperature treatment, in order to prevent flatness of the substrate from being impaired due to the substrate being exposed to a high temperature. With respect to this point, the glass can also exhibit high heat resistance due to having the above glass composition. The glass transition temperature Tg, which is an indicator related to heat resistance, of the glass may be 550° C. or more, is preferably 600° C. or more, and more preferably 610° C. or more, 620° C. or more, 630° C. or more, 640° C. or more, 650° C. or more, 660° C. or more, 670° C. or more, 680° C. or more, 690° C. or more, 700° C. or more, 710° C. or more, 720° C. or more, 730° C. or more, 740° C. or more, or 750° C. or more in order of increasing preference. Also, the Tg of the glass may be, for example, 850° C. or less, 830° C. or less or 810° C. or less, 790° C. or less, 770° C. or less or 750° C. or less. However, a higher Tg is more preferable from the viewpoint of heat resistance, and thus the Tg thereof is not particularly limited to the above-mentioned values.

(Thermal Expansion Coefficient)

An HDD with a built-in magnetic recording medium usually has a structure in which the center portion is pressed down by a spindle of a spindle motor and a clamp, and the magnetic recording medium itself is rotated. Thus, when there is a large difference between respective thermal expansion coefficients of a magnetic recording medium substrate and a spindle material constituting the spindle portion, deviation occurs during use between thermal expansion/thermal contraction of the spindle and thermal expansion/thermal contraction of the magnetic recording medium substrate relative to ambient temperature changes. As a result, a phenomenon in which the magnetic recording medium deforms will occur. When such a phenomenon occurs, a head cannot read written information, causing deterioration of the reliability of recording/reproduction. Therefore, there is a desire to avoid an excessive increase in the difference between the thermal expansion coefficient of the glass for a magnetic recording medium substrate and the thermal expansion coefficient of the spindle material (e.g., stainless steel). Generally, a spindle material for an HDD has an average linear expansion coefficient (thermal expansion coefficient) of $70\times10^{-7}$/° C. or more within a temperature range of 100° C. to 300° C., and in a case where the average linear expansion coefficient of a glass for a magnetic recording medium substrate at 100° C. to 300° C. is $30\times10^{-7}$/° C. or more, the difference between the thermal expansion coefficient of the glass and that of the spindle material is small, and thus the glass for a magnetic recording medium substrate can contribute to improving the reliability of the magnetic recording medium. The average linear expansion coefficient $\alpha$ of the glass at 100° C. to 300° C. is preferably $34.0\times10^{-7}$/° C. or more, more preferably $35.0\times10^{-7}$/° C. or more, and even more preferably $36.0\times10^{-7}$/° C. or more, further preferably $37.0\times10^{-7}$/° C. or more, still more preferably $38.0\times10^{-7}$/° C. or more, yet more preferably $39\times10^{-7}$/° C. or more, and still more preferably $40.0\times10^{-7}$/° C. or more. Also, the average linear expansion coefficient $\alpha$ of the glass at 100° C. to 300° C. is preferably $70.0\times10^{-7}$/° C. or less, more preferably $68.0\times10^{-7}$/° C. or less, even more preferably $65.0\times10^{-7}$/° C. or less, further preferably $63.0\times10^{-7}$/° C. or less, still more preferably $60.0\times10^{-7}$/° C. or less, yet more preferably $57.0\times10^{-7}$/° C. or less, and still more preferably $55.0\times10^{-7}$/° C. or less.

(Liquidus Temperature LT)

One example of an indicator for the thermal stability of glass is the liquidus temperature (LT). The LT of the glass is preferably 1320° C. or less, more preferably 1310° C. or less, and even more preferably 1300° C. or less, 1290° C. or less, 1280° C. or less, 1270° C. or less, 1260° C. or less, 1250° C. or less, or 1240° C. or less in order of increasing preference. A glass having a low liquidus temperature LT is preferable because such a glass is unlikely to devitrify. The lower limit of the LT may be 800° C. or more, for example, but is not particularly limited.

The various properties described above can be obtained using methods described later regarding Examples.

[Magnetic Recording Medium Substrate]

A magnetic recording medium substrate according to an aspect of the present invention is made of the above-described glass.

Magnetic recording medium substrates can be manufactured through processes for heating raw glass materials to thereby prepare molten glass, for molding the molten glass into a plate shape by any one of a press molding method, a down-draw method, and a float method, and for processing the obtained plate-shaped glass. In a press molding method, molten glass flowing out from a glass outflow pipe is cut to a predetermined volume to give an intended molten glass lump, which is press-molded with a press molding die to thereby produce a thin-walled disk-shaped substrate blank, for example. Subsequently, the obtained substrate blank is given a center hole, and subjected to polishing processes such as outer/inner circumference processing, lapping, and polishing for both main surfaces. Subsequently, a disk-shaped substrate can be obtained through cleaning processes including acid cleaning and alkali cleaning. Known techniques relating to manufacturing of magnetic recording medium substrates can be used for various processes performed in order to obtain the above magnetic recording medium substrates.

In the above magnetic recording medium substrate, in an embodiment, the surface composition and internal composition thereof are homogeneous. Here, "the surface composition and internal composition thereof are homogeneous" means that no ion exchange has been performed (that is, an ion-exchange layer is not contained). Because a magnetic recording medium substrate having no ion-exchange layer is manufactured without performing ion exchange treatment, manufacturing costs can be drastically reduced.

Also, in an embodiment, the above-described magnetic recording medium substrate has an ion-exchange layer on a part of or on the entirety of the surface. An ion-exchange layer exhibits compression stress, and thus the presence or absence of an ion-exchange layer can be confirmed by fracturing the substrate perpendicularly to a main surface and obtaining a stress profile by the Babinet method in the fracture surface. A "main surface" is a surface of a substrate on which a magnetic recording layer is to be provided or has been provided. This surface is a surface having the largest area among surfaces of a magnetic recording medium substrate, and thus is referred to as a main surface. In a case of a disk-shaped magnetic recording medium, the main surface corresponds to a circular surface (if there is a center hole, the center hole is excluded) of the disk. The presence or absence of an ion-exchange layer can be confirmed also by a method or the like for measuring concentration distribution of alkali metal ions in the depth direction from the substrate surface.

An ion-exchange layer can be formed by bring an alkali salt into contact with a substrate surface under a high temperature and exchanging an alkali metal ion in the alkali salt for an alkali metal ion in the substrate. Known techniques can be applied to ion exchange (also referred to as a "strengthening treatment" or "chemical strengthening"), and as an example, paragraphs 0068 and 0069 in WO 2011/019010A1 can be referred to.

The thickness of the above-described magnetic recording medium substrate is 1.5 mm or less, preferably 1.2 mm or less, more preferably 1.0 mm or less, further preferably 0.8 mm or less, still more preferably less than 0.8 mm, yet more preferably 0.7 mm or less, and further more preferably 0.6 mm or less. Also, the thickness of the magnetic recording medium substrate is 0.3 mm or more, for example. Reducing the thickness of the magnetic recording medium substrate is preferable from the viewpoint of improving the storage capacity of an HDD. Furthermore, the above-described magnetic recording medium substrate preferably has a disk shape having a center hole.

The above-described magnetic recording medium substrate is made of an amorphous glass. Amorphous glass can realize good surface smoothness when it is processed into a substrate, as compared with crystallized glass.

The above magnetic recording medium substrate is made of the glass according to an aspect of the present invention, and thus can have the above-mentioned physical properties of the above glass.

[Magnetic Recording Medium]

An aspect of the present invention relates to a magnetic recording medium having the above-described magnetic recording medium substrate and a magnetic recording layer.

A magnetic recording medium is referred to as a magnetic disk, hard disk, or the like, and is suitable for various magnetic recording/reproducing devices, such as: internal memories (such as fixed disk) for desktop personal computers, computers for servers, notebook computers, and mobile personal computers; internal memories for portable recording/reproducing devices for recording and reproducing images and/or voices; and recording/reproducing devices for in-vehicle audio devices. In the present invention and this specification, a "magnetic recording/reproducing devices" means a device capable of performing one of or both of magnetic recording of information and magnetic reproduction of information.

A magnetic recording medium has a configuration in which, for example, at least an adhesive layer, an undercoat layer, a magnetic layer (magnetic recording layer), a protecting layer, and a lubricating layer are stacked, in that order from a main surface, on the main surface of a magnetic recording medium substrate.

A magnetic recording medium substrate is introduced into an evacuated film formation apparatus, and sequential film formation from the adhesive layer to the magnetic layer is performed over the main surface of a magnetic recording medium substrate by a DC (Direct Current) magnetron sputtering process in an Ar atmosphere, for example. CrTi can be used for the adhesive layer, for example, and a material containing Ru or MgO can be used for the undercoat layer, for example. Note that a soft magnetic layer or a heat sink layer may also be added as appropriate. After the above-described film formation, for example, by a CVD (Chemical Vapor Deposition) process, the protecting layer is formed using $C_2H_4$, which is subjected to a nitriding treatment of introducing nitrogen to the surface in the same chamber to thereby be able to form a magnetic recording medium. Thereafter, for example, applying PFPE (polyfluoropolyether) onto the protecting layer by a dip coat method makes it possible to form the lubricating layer.

In order to achieve further higher density recording with a magnetic recording medium, a magnetic recording layer preferably contains a magnetic material with high magnetic anisotropy energy. Magnetic materials preferable from this viewpoint can include Fe—Pt-based magnetic materials and Co—Pt-based magnetic materials. Note that, here, "-based" means inclusion. Namely, the above-described magnetic recording medium can have a magnetic recording layer containing Fe and Pt, or Co and Pt, as the magnetic recording layer. With respect to a magnetic recording layer containing these magnetic materials and to a film formation method thereof, descriptions in paragraph 0074 in WO 2011/019010A1, and Examples in this publication can be referred to. Furthermore, a magnetic recording medium having such a magnetic recording layer is preferably applied to a magnetic recording apparatus by a recording system referred to as an energy-assisted recording system. Among energy-assisted recording systems, a recording system in which magnetization reversal is assisted by irradiation with near-field light or the like is referred to as a heat-assisted recording system, and a recording system in which magnetization reversal is assisted by microwaves is referred to as a microwave-assisted recording system. With respect to details of these, paragraph 0075 in WO 2011/019010A1 can be referred to. Note that a conventional CoPtCr-based material may be used as a magnetic material for forming a magnetic recording layer.

Incidentally, in recent years, a significant reduction in a gap between a recording/reproducing element portion of a magnetic head and a surface of a magnetic recording medium (low floating amount) is achieved by mounting a DFH (Dynamic Flying Height) mechanism on the magnetic head, and thereby the achievement of further higher recording density is realized. The DFH mechanism is a function that causes only the vicinity of a recording/reproducing element portion to project in the medium surface direction, by providing a heating portion such as a micro heater near the element portion of a magnetic head. Consequently, the distance (flying height) between the magnetic head and the magnetic recording layer of a medium becomes smaller, and thus it becomes possible to read signals from smaller magnetic particles and to achieve further higher recording density. In an embodiment, the magnetic recording medium substrate can be used as a substrate of a magnetic recording medium that is to be applied to a magnetic recording/reproducing device provided with a magnetic head having a DFH mechanism.

There is no particular limitation regarding the dimensions of both the above-described magnetic recording medium substrate (e.g., magnetic-disk glass substrate) and the magnetic recording medium (e.g., magnetic disk). For example, the medium and substrate can also be downsized because higher recording density is possible. Also, it is possible to increase the size of the medium and the substrate in order to increase storage capacity per magnetic recording medium. They can have a nominal diameter of, naturally, 2.5 inches, a smaller diameter (e.g., 1 inch, 1.8 inches), 3 inches, 3.5 inches, or have a dimension larger than 3.5 inches, for example.

[Glass Spacer for Magnetic Recording/Reproducing Device]

A glass spacer for a magnetic recording/reproducing device (hereinafter, also simply referred to as "glass spacer") according to an aspect of the present invention is made of the above-described glass.

A magnetic recording medium can be used for magnetically recording and/or reproducing information in a magnetic recording/reproducing device. A magnetic recording/reproducing device is usually provided with a spacer for fixing a magnetic recording medium to a spindle of a spindle motor and/or for keeping a distance between a plurality of magnetic recording media. In recent years, the use of a glass spacer as the spacer in this manner has been proposed. For reasons similar to the reasons described in detail regarding a glass for a magnetic recording medium substrate, it is also desirable that this glass spacer has high rigidity. To address this, glass having the above composition is suitable as a glass spacer for a magnetic recording/reproducing device since the above-described glass can have high rigidity.

A spacer for a magnetic recording/reproducing device is a ring-shaped member, and details of a configuration of the glass spacer, a method for manufacturing the glass spacer, and the like are known. Furthermore, with respect to a method for manufacturing a glass spacer, the above description regarding a method for manufacturing a glass for a magnetic recording medium substrate and a method for manufacturing a magnetic recording medium substrate can also be referred to. Furthermore, with regard to other details of a glass composition, glass physical properties, and the like of the glass spacer, the above description regarding the glass, the magnetic recording medium substrate made of the glass, and the magnetic recording medium having this magnetic recording medium substrate can be referred to.

Note that the spacer for a magnetic recording/reproducing device can be constituted by the glass spacer, or may also have a configuration in which one or more films such as conductive films are formed on a surface of the glass spacer. In order to eliminate static electricity generated while a magnetic recording medium rotates, a conductive film such as an NiP alloy film can also be formed on the surface of a glass spacer through plating, or using an immersion method, a vapor deposition method, a sputtering method, or the like. Also, the surface smoothness of a glass spacer can be enhanced through polishing processing (for example, the average surface roughness Ra is 1 μm or less), which can increase adhesion between a magnetic recording medium and a spacer to thereby inhibit the occurrence of positional displacement.

[Magnetic Recording/Reproducing Device]

An aspect of the present invention relates to a magnetic recording/reproducing device including one or more selected from the group consisting of the magnetic recording medium and the glass spacer.

A magnetic recording/reproducing device includes at least one magnetic recording medium and at least one spacer, and further includes usually a spindle motor for rotationally driving the magnetic recording medium, and at least one magnetic head for performing recording and/or reproduction of information to the magnetic recording medium.

The above-described magnetic recording/reproducing device according to an aspect of the present invention can include, as at least one magnetic recording medium, the magnetic recording medium according to an aspect of the present invention, and also can include a plurality of the magnetic recording media according to an aspect of the present invention. The above-described magnetic recording/reproducing device according to an aspect of the present invention can include, as at least one spacer, the glass spacer according to an aspect of the present invention, and also can include a plurality of the glass spacers according to an aspect of the present invention. A small difference between a thermal expansion coefficient of a magnetic recording medium and a thermal expansion coefficient of a spacer is preferable from the viewpoint of inhibiting the occurrence of phenomena that may arise due to the difference between thermal expansion coefficients of the two, for example, strain of a magnetic recording medium and lowering of stability during the rotation due to positional displacement of a magnetic recording medium. From this viewpoint, it is preferable that the magnetic recording/reproducing device according to an aspect of the present invention includes: the magnetic recording medium according to an aspect of the present invention, as at least one magnetic recording medium, and as more magnetic recording media in a case where a plurality of magnetic recording media are to be included; and includes: the glass spacer according to an aspect of the present invention, as at least one spacer, and as more spacers in a case where a plurality of spacers are to be included. Furthermore, for example, the magnetic recording/reproducing device according to an aspect of the present invention can be one in which the glass constituting the magnetic recording medium substrate contained in the magnetic recording medium and the glass constituting the glass spacer have the same glass composition.

The magnetic recording/reproducing device according to an aspect of the present invention may be one that contains at least one of the magnetic recording medium according to an aspect of the present invention and the glass spacer according to an aspect of the present invention. Known techniques related to recording/reproducing devices can be applied to other points. In an aspect, it is possible to use, as a magnetic head, an energy-assisted magnetic recording head having; an energy source (for example, heat source such as a laser light source, microwaves, and the like) for assisting magnetization reversal (assisting writing of magnetic signals); a recording element portion; and a reproducing element portion. The magnetic recording/reproducing device, as described above, using an energy-assisted recording system that includes the energy-assisted magnetic recording head is useful as a magnetic recording/reproducing device having high recording density and high reliability. Furthermore, when manufacturing a magnetic recording medium used for a magnetic recording/reproducing device of an energy-assisted recording system such as a heat-assisted recording system provided with a heat-assisted magnetic recording head having a laser light source or the like, sometimes a magnetic recording layer containing a magnetic material with high magnetic anisotropy energy is formed on a magnetic recording medium substrate. In order to form such a magnetic recording layer, film formation is usually performed at a high temperature or heat treatment is performed at a high temperature after film formation. The magnetic recording medium substrate according to an aspect of the present invention may, in an embodiment, be a magnetic recording medium substrate that may have high heat resistance capable of withstanding such treatment at a high temperature. However, the magnetic recording/reproducing device according to an aspect of the present invention is not limited to an energy-assisted magnetic recording/reproducing device.

EXAMPLES

Hereinafter, the present invention will be described in more detail with reference to Examples. However, the present invention is not limited to embodiments represented in Examples.

Examples 1 to 62

Raw materials such as oxides, carbonates, nitrates, sulfates, and hydroxides were weighed so as to give glasses with respective compositions as shown in Table 1, and these materials were then mixed to give respective blended raw materials. Each molten glass obtained by introducing the blended raw material into a melting tank and by heating and melting the same in a range of 1400° C. to 1600° C., was held at 1400° C. to 1550° C. for 6 hours in a clarification tank. Then, the temperature was lowered (temperature decrease) and each molten glass was held in a range of 1200° C. to 1400° C. for 1 hour and was then molded to give each glass (amorphous oxide glass) for evaluation described below.

Evaluation of Glass Physical Properties (1) Glass Transition Temperature Tg, Average Linear Expansion Coefficient α

A glass transition temperature Tg, and an average linear expansion coefficient α at 100° C. to 300° C. of each glass were measured using a thermomechanical analysis (TMA) apparatus.

(2) Young's Modulus E

The Young's modulus of each glass was measured using an ultrasonic method.

(3) Specific Gravity d

The specific gravity of each glass was measured using the Archimedes method.

(4) Specific Elastic Modulus

A specific elastic modulus was calculated from the Young's modulus obtained in (2) and the specific gravity obtained in (3).

The above results are shown in Table 1 (Table 1-1 to Table 1-5).

TABLE 1

| mol % | $B_2O_3$ | $SiO_2$ | $Al_2O_3$ | MgO | CaO | $Li_2O$ | $Na_2O$ | $K_2O$ | $TiO_2$ | $Y_2O_3$ | Total | $Na_2O$ + $K_2O$ | Specific Elastic Modulus E/d (MNm/kg) | Young's Modulus E (Gpa) | Specific Gravity d | Glass Transition Temperature Tg (° C.) | Thermal Expansion Coefficient α ($\times 10^{-7}$/° C.) |
|---|---|---|---|---|---|---|---|---|---|---|---|---|---|---|---|---|---|
| Ex. 1 | 0.0 | 58.0 | 15.0 | 23.0 | 0.0 | 4.0 | 0.0 | 0.0 | 0.0 | 0.0 | 100.0 | 0.0 | 38.8 | 99.9 | 2.58 | 723 | 45.0 |
| Ex. 2 | 0.0 | 60.0 | 13.0 | 23.0 | 0.0 | 4.0 | 0.0 | 0.0 | 0.0 | 0.0 | 100.0 | 0.0 | 38.5 | 98.4 | 2.56 | 719 | 44.9 |
| Ex. 3 | 0.1 | 60.0 | 13.0 | 22.9 | 0.0 | 4.0 | 0.0 | 0.0 | 0.0 | 0.0 | 100.0 | 0.0 | 38.4 | 98.2 | 2.56 | 717 | 44.8 |
| Ex. 4 | 0.3 | 60.0 | 13.0 | 22.7 | 0.0 | 4.0 | 0.0 | 0.0 | 0.0 | 0.0 | 100.0 | 0.0 | 38.3 | 97.8 | 2.55 | 715 | 44.9 |
| Ex. 5 | 0.3 | 60.0 | 15.0 | 20.7 | 0.0 | 4.0 | 0.0 | 0.0 | 0.0 | 0.0 | 100.0 | 0.0 | 38.4 | 98.5 | 2.57 | 727 | 42.7 |
| Ex. 6 | 0.5 | 60.0 | 15.0 | 20.5 | 0.0 | 4.0 | 0.0 | 0.0 | 0.0 | 0.0 | 100.0 | 0.0 | 38.3 | 98.3 | 2.57 | 725 | 42.5 |
| Ex. 7 | 1.0 | 60.0 | 15.0 | 20.0 | 0.0 | 4.0 | 0.0 | 0.0 | 0.0 | 0.0 | 100.0 | 0.0 | 38.2 | 97.6 | 2.56 | 722 | 43.0 |
| Ex. 8 | 2.0 | 60.0 | 15.0 | 19.0 | 0.0 | 4.0 | 0.0 | 0.0 | 0.0 | 0.0 | 100.0 | 0.0 | 37.8 | 96.2 | 2.54 | 715 | 42.0 |
| Ex. 9 | 5.0 | 60.0 | 15.0 | 16.0 | 0.0 | 4.0 | 0.0 | 0.0 | 0.0 | 0.0 | 100.0 | 0.0 | 36.6 | 91.5 | 2.50 | 697 | 39.2 |
| Ex. 10 | 0.3 | 60.0 | 17.0 | 18.7 | 0.0 | 4.0 | 0.0 | 0.0 | 0.0 | 0.0 | 100.0 | 0.0 | 38.6 | 98.2 | 2.55 | 737 | 41.8 |
| Ex. 11 | 1.0 | 60.0 | 17.0 | 18.0 | 0.0 | 4.0 | 0.0 | 0.0 | 0.0 | 0.0 | 100.0 | 0.0 | 38.4 | 97.5 | 2.54 | 732 | 41.1 |
| Ex. 12 | 3.0 | 60.0 | 17.0 | 16.0 | 0.0 | 4.0 | 0.0 | 0.0 | 0.0 | 0.0 | 100.0 | 0.0 | 37.6 | 94.4 | 2.51 | 719 | 39.9 |
| Ex. 13 | 5.0 | 60.0 | 17.0 | 14.0 | 0.0 | 4.0 | 0.0 | 0.0 | 0.0 | 0.0 | 100.0 | 0.0 | 36.9 | 91.6 | 2.48 | 707 | 38.3 |
| Ex. 14 | 0.3 | 65.0 | 13.0 | 19.7 | 0.0 | 2.0 | 0.0 | 0.0 | 0.0 | 0.0 | 100.0 | 0.0 | 38.1 | 95.8 | 2.52 | 756 | 36.9 |
| Ex. 15 | 0.3 | 65.0 | 13.0 | 19.2 | 0.0 | 2.5 | 0.0 | 0.0 | 0.0 | 0.0 | 100.0 | 0.0 | 38.2 | 95.9 | 2.51 | 745 | 38.4 |
| Ex. 16 | 0.3 | 65.0 | 13.0 | 18.7 | 0.0 | 3.0 | 0.0 | 0.0 | 0.0 | 0.0 | 100.0 | 0.0 | 37.9 | 95.1 | 2.51 | 740 | 38.1 |
| Ex. 17 | 0.3 | 65.0 | 13.0 | 18.2 | 0.0 | 3.5 | 0.0 | 0.0 | 0.0 | 0.0 | 100.0 | 0.0 | 37.9 | 95.1 | 2.51 | 734 | 39.5 |
| Ex. 18 | 0.3 | 65.0 | 13.0 | 17.7 | 0.0 | 4.0 | 0.0 | 0.0 | 0.0 | 0.0 | 100.0 | 0.0 | 37.5 | 93.6 | 2.50 | 722 | 40.4 |
| Ex. 19 | 0.3 | 65.0 | 14.0 | 18.2 | 0.0 | 2.5 | 0.0 | 0.0 | 0.0 | 0.0 | 100.0 | 0.0 | 38.2 | 96.0 | 2.51 | 751 | 37.2 |
| Ex. 20 | 0.3 | 65.0 | 14.0 | 17.7 | 0.0 | 3.0 | 0.0 | 0.0 | 0.0 | 0.0 | 100.0 | 0.0 | 37.9 | 94.9 | 2.50 | 745 | 38.3 |
| Ex. 21 | 0.3 | 65.0 | 14.0 | 17.2 | 0.0 | 3.5 | 0.0 | 0.0 | 0.0 | 0.0 | 100.0 | 0.0 | 38.1 | 95.2 | 2.50 | 739 | 38.9 |
| Ex. 22 | 0.3 | 65.0 | 14.0 | 16.7 | 0.0 | 4.0 | 0.0 | 0.0 | 0.0 | 0.0 | 100.0 | 0.0 | 37.8 | 94.4 | 2.50 | 732 | 39.0 |
| Ex. 23 | 0.3 | 65.0 | 13.0 | 19.7 | 0.0 | 2.0 | 0.0 | 0.0 | 0.0 | 0.0 | 100.0 | 0.0 | 38.1 | 95.8 | 2.52 | 756 | 36.9 |
| Ex. 24 | 1.0 | 65.0 | 13.0 | 19.0 | 0.0 | 2.0 | 0.0 | 0.0 | 0.0 | 0.0 | 100.0 | 0.0 | 37.7 | 94.3 | 2.50 | 748 | 39.1 |
| Ex. 25 | 0.3 | 65.0 | 14.0 | 18.2 | 0.0 | 2.5 | 0.0 | 0.0 | 0.0 | 0.0 | 100.0 | 0.0 | 38.2 | 96.0 | 2.51 | 754 | 37.2 |
| Ex. 26 | 1.0 | 65.0 | 14.0 | 17.5 | 0.0 | 2.5 | 0.0 | 0.0 | 0.0 | 0.0 | 100.0 | 0.0 | 38.0 | 94.8 | 2.50 | 745 | 37.1 |
| Ex. 27 | 0.3 | 65.0 | 13.0 | 18.7 | 0.0 | 3.0 | 0.0 | 0.0 | 0.0 | 0.0 | 100.0 | 0.0 | 37.9 | 95.1 | 2.51 | 740 | 38.1 |
| Ex. 28 | 0.3 | 67.0 | 13.0 | 16.7 | 0.0 | 3.0 | 0.0 | 0.0 | 0.0 | 0.0 | 100.0 | 0.0 | 37.8 | 94.1 | 2.49 | 746 | 37.8 |
| Ex. 29 | 0.3 | 65.0 | 13.0 | 18.2 | 0.0 | 3.5 | 0.0 | 0.0 | 0.0 | 0.0 | 100.0 | 0.0 | 37.9 | 95.1 | 2.51 | 734 | 39.5 |
| Ex. 30 | 0.3 | 67.0 | 13.0 | 16.2 | 0.0 | 3.5 | 0.0 | 0.0 | 0.0 | 0.0 | 100.0 | 0.0 | 37.8 | 93.9 | 2.48 | 739 | 37.5 |
| Ex. 31 | 0.3 | 67.0 | 14.0 | 15.2 | 0.0 | 3.5 | 0.0 | 0.0 | 0.0 | 0.0 | 100.0 | 0.0 | 37.6 | 93.3 | 2.48 | 745 | 37.1 |
| Ex. 32 | 0.3 | 65.0 | 14.0 | 16.7 | 0.0 | 4.0 | 0.0 | 0.0 | 0.0 | 0.0 | 100.0 | 0.0 | 37.8 | 94.4 | 2.50 | 732 | 39.0 |
| Ex. 33 | 0.3 | 67.0 | 14.0 | 14.7 | 0.0 | 4.0 | 0.0 | 0.0 | 0.0 | 0.0 | 100.0 | 0.0 | 37.4 | 92.7 | 2.48 | 741 | 38.1 |
| Ex. 34 | 0.3 | 60.0 | 13.0 | 21.7 | 0.0 | 5.0 | 0.0 | 0.0 | 0.0 | 0.0 | 100.0 | 0.0 | 38.5 | 97.5 | 2.53 | 672 | 48.2 |
| Ex. 35 | 0.3 | 60.0 | 13.0 | 20.7 | 0.0 | 6.0 | 0.0 | 0.0 | 0.0 | 0.0 | 100.0 | 0.0 | 38.4 | 97.2 | 2.53 | 650 | 50.4 |
| Ex. 36 | 0.3 | 60.0 | 13.0 | 18.7 | 0.0 | 8.0 | 0.0 | 0.0 | 0.0 | 0.0 | 100.0 | 0.0 | 38.3 | 96.6 | 2.52 | 606 | 54.8 |

TABLE 1-continued

| mol % | $B_2O_3$ | $SiO_2$ | $Al_2O_3$ | MgO | CaO | $Li_2O$ | $Na_2O$ | $K_2O$ | $TiO_2$ | $Y_2O_3$ | Total | $Na_2O$ + $K_2O$ | Specific Elastic Modulus E/d (MNm/kg) | Young's Modulus E (Gpa) | Specific Gravity d | Glass Transition Temperature Tg (° C.) | Thermal Expansion Coefficient α ($\times 10^{-7}$/° C.) |
|---|---|---|---|---|---|---|---|---|---|---|---|---|---|---|---|---|---|
| Ex. 37 | 0.3 | 60.0 | 13.0 | 16.7 | 0.0 | 10.0 | 0.0 | 0.0 | 0.0 | 0.0 | 100.0 | 0.0 | 38.3 | 96.4 | 2.52 | 562 | 59.2 |
| Ex. 38 | 0.3 | 60.0 | 13.0 | 22.6 | 0.1 | 4.0 | 0.0 | 0.0 | 0.0 | 0.0 | 100.0 | 0.0 | 38.4 | 98.0 | 2.56 | 716 | 46.9 |
| Ex. 39 | 0.3 | 60.0 | 13.0 | 22.2 | 0.5 | 4.0 | 0.0 | 0.0 | 0.0 | 0.0 | 100.0 | 0.0 | 38.3 | 98.9 | 2.58 | 727 | 48.3 |
| Ex. 40 | 0.3 | 60.0 | 13.0 | 22.7 | 0.0 | 1.0 | 2.0 | 1.0 | 0.0 | 0.0 | 100.0 | 3.0 | 35.9 | 93.8 | 2.61 | 735 | 56.8 |
| Ex. 41 | 0.3 | 60.0 | 13.0 | 19.7 | 0.0 | 1.0 | 3.0 | 3.0 | 0.0 | 0.0 | 100.0 | 6.0 | 35.1 | 92.3 | 2.63 | 746 | 62.5 |
| Ex. 42 | 0.3 | 60.0 | 10.0 | 25.7 | 0.0 | 4.0 | 0.0 | 0.0 | 0.0 | 0.0 | 100.0 | 0.0 | 38.0 | 96.4 | 2.54 | 678 | 47.2 |
| Ex. 43 | 0.3 | 70.0 | 13.0 | 12.7 | 0.0 | 4.0 | 0.0 | 0.0 | 0.0 | 0.0 | 100.0 | 0.0 | 36.3 | 88.4 | 2.44 | 749 | 42.7 |
| Ex. 44 | 0.3 | 65.0 | 13.5 | 17.2 | 0.0 | 3.5 | 0.0 | 0.0 | 0.5 | 0.0 | 100.0 | 0.0 | 37.7 | 94.2 | 2.50 | 732 | 40.5 |
| Ex. 45 | 0.3 | 65.0 | 13.0 | 17.2 | 0.0 | 3.5 | 0.0 | 0.0 | 1.0 | 0.0 | 100.0 | 0.0 | 37.4 | 93.6 | 2.50 | 728 | 37.5 |
| Ex. 46 | 0.3 | 65.0 | 14.0 | 16.7 | 0.0 | 3.5 | 0.0 | 0.0 | 0.5 | 0.0 | 100.0 | 0.0 | 37.6 | 94.0 | 2.50 | 737 | 38.2 |
| Ex. 47 | 0.3 | 65.0 | 14.0 | 16.2 | 0.0 | 3.5 | 0.0 | 0.0 | 1.0 | 0.0 | 100.0 | 0.0 | 38.2 | 95.4 | 2.50 | 730 | 38.5 |
| Ex. 48 | 0.3 | 65.0 | 13.5 | 16.7 | 0.0 | 3.5 | 0.0 | 0.0 | 1.0 | 0.0 | 100.0 | 0.0 | 37.4 | 93.6 | 2.50 | 731 | 37.5 |
| Ex. 49 | 0.3 | 65.0 | 13.5 | 17.2 | 0.0 | 3.5 | 0.0 | 0.0 | 0.0 | 0.5 | 100.0 | 0.0 | 37.6 | 95.2 | 2.53 | 738 | 41.1 |
| Ex. 50 | 0.3 | 65.0 | 13.0 | 17.2 | 0.0 | 3.5 | 0.0 | 0.0 | 0.0 | 1.0 | 100.0 | 0.0 | 37.6 | 96.2 | 2.56 | 735 | 38.9 |
| Ex. 51 | 0.3 | 65.0 | 14.0 | 16.7 | 0.0 | 3.5 | 0.0 | 0.0 | 0.0 | 0.5 | 100.0 | 0.0 | 37.8 | 95.5 | 2.53 | 737 | 38.4 |
| Ex. 52 | 0.3 | 65.0 | 14.0 | 16.2 | 0.0 | 3.5 | 0.0 | 0.0 | 0.0 | 1.0 | 100.0 | 0.0 | 37.3 | 95.4 | 2.56 | 730 | 38.8 |
| Ex. 53 | 0.3 | 65.0 | 13.5 | 16.7 | 0.0 | 3.5 | 0.0 | 0.0 | 0.0 | 1.0 | 100.0 | 0.0 | 37.8 | 96.7 | 2.56 | 731 | 39.0 |
| Ex. 54 | 0.3 | 60.0 | 11.0 | 24.7 | 0.0 | 4.0 | 0.0 | 0.0 | 0.0 | 0.0 | 100.0 | 0.0 | 37.9 | 96.6 | 2.55 | 684 | 46.3 |
| Ex. 55 | 0.3 | 60.0 | 12.0 | 23.7 | 0.0 | 4.0 | 0.0 | 0.0 | 0.0 | 0.0 | 100.0 | 0.0 | 38.0 | 96.8 | 2.55 | 678 | 45.2 |
| Ex. 56 | 0.3 | 54.0 | 15.0 | 24.7 | 0.0 | 6.0 | 0.0 | 0.0 | 0.0 | 0.0 | 100.0 | 0.0 | 39.2 | 101.6 | 2.59 | 679 | 54.0 |
| Ex. 57 | 0.3 | 56.0 | 15.0 | 22.7 | 0.0 | 6.0 | 0.0 | 0.0 | 0.0 | 0.0 | 100.0 | 0.0 | 38.8 | 100.1 | 2.58 | 697 | 52.5 |
| Ex. 58 | 0.3 | 60.0 | 13.0 | 21.7 | 1.0 | 4.0 | 0.0 | 0.0 | 0.0 | 0.0 | 100.0 | 0.0 | 38.5 | 98.6 | 2.56 | 723 | 48.3 |
| Ex. 59 | 0.0 | 60.0 | 19.0 | 19.0 | 0.0 | 2.0 | 0.0 | 0.0 | 0.0 | 0.0 | 100.0 | 0.0 | 39.3 | 101.2 | 2.57 | 781 | 44.5 |
| Ex. 60 | 0.0 | 60.0 | 19.0 | 18.0 | 0.0 | 3.0 | 0.0 | 0.0 | 0.0 | 0.0 | 100.0 | 0.0 | 39.1 | 100.2 | 2.57 | 777 | 46.3 |
| Ex. 61 | 0.0 | 60.0 | 19.0 | 17.0 | 0.0 | 4.0 | 0.0 | 0.0 | 0.0 | 0.0 | 100.0 | 0.0 | 39.1 | 100.0 | 2.56 | 757 | 41.2 |
| Ex. 62 | 0.0 | 60.0 | 19.0 | 16.0 | 0.0 | 5.0 | 0.0 | 0.0 | 0.0 | 0.0 | 100.0 | 0.0 | 38.6 | 98.4 | 2.55 | 751 | 46.5 |

It can be confirmed from the results shown in Table 1 that the glasses of Examples 1 to 62 have high rigidity. The glass of Example 27 shown in Table 5 of JP 2002-358626A (referred to as "comparative glass" hereinafter) has a glass composition containing $SiO_2$ in an amount of 65.0 mol %, $Al_2O_3$ in an amount of 7.0 mol %, MgO in an amount of 1.0 mol %, CaO in an amount of 1.0 mol %, $Li_2O$ in an amount of 10.0 mol %, $Na_2O$ in an amount of 10.5 mol %, and $K_2O$ in an amount of 2.5 mol %, for example, and this glass composition is different from the glass composition of a glass according to an aspect of the present invention described above. The value calculated by dividing the value of the Young's modulus of the comparative glass shown in Table 5 of JP 2002-358626A by the value of the density was about 32.45, which was lower than the value of specific elastic moduli of Examples 1 to 62 shown in Table 1.

(5) Liquidus Temperature LT

The liquidus temperature of glass shown in Table 2 was obtained using the following method.

50 g of a glass was weighed into a platinum crucible. The platinum crucible with a platinum lid closed was placed in a heating furnace at an internal ambient temperature of 1350° C. to completely melt the glass in the crucible, the internal ambient temperature was lowered to a predetermined temperature, and the glass was held at the predetermined temperature for 16 hours. After the glass was held for 16 hours, the platinum crucible was taken out of the furnace and left to cool the glass to room temperature (about 20° C. to 25° C.). Whether or not crystals were precipitated was examined by visually observing the cooled glass.

The above operation was carried out from 1330° C. to 1200° C. in increments of 10° C., and the lowest temperature at which no crystals were precipitated was used as the liquidus temperature LT.

TABLE 2

| | Liquidus Temperature LT(° C.) |
|---|---|
| Ex. 1 | 1290 |
| Ex. 2 | 1290 |
| Ex. 3 | 1280 |
| Ex. 4 | 1230 |
| Ex. 5 | 1280 |
| Ex. 6 | 1280 |
| Ex. 9 | 1320 |
| Ex. 10 | 1300 |
| Ex. 11 | 1320 |
| Ex. 15 | 1310 |
| Ex. 16 | 1300 |
| Ex. 20 | 1290 |
| Ex. 21 | 1280 |
| Ex. 23 | 1320 |
| Ex. 24 | 1320 |
| Ex. 25 | 1320 |
| Ex. 26 | 1320 |
| Ex. 28 | 1300 |
| Ex. 31 | 1280 |
| Ex. 44 | 1250 |
| Ex. 45 | 1260 |
| Ex. 46 | 1250 |
| Ex. 47 | 1260 |
| Ex. 48 | 1260 |
| Ex. 49 | 1260 |
| Ex. 51 | 1260 |
| Ex. 52 | 1260 |
| Ex. 53 | 1250 |

It was confirmed using the following method that the liquidus temperatures LT of the glasses of Examples 17, 18, 22, 29, and 33 were 1300° C. or less.

50 g of a glass was weighed into a platinum crucible. The platinum crucible with a platinum lid closed was placed in a heating furnace at an internal ambient temperature of 1350° C. to completely melt the glass in the crucible, the internal ambient temperature was lowered to 1300° C., and the glass was held at 1300° C. for 16 hours. After the glass was held for 16 hours, the platinum crucible was taken out of the furnace and left to cool the glass to room temperature (about 20° C. to 25° C.). The cooled glass was visually observed, and whether or not crystals were precipitated was examined, and no crystal precipitation was observed.

Production of Magnetic Recording Medium Substrate (1) Production of Substrate Blank A disk-shaped substrate blank was produced using a method A or B below. It is also possible to obtain a glass blank for producing a glass spacer for a magnetic recording/reproducing device, using the same method.

(Method A)

With regard to a glass having a composition shown in Table 1, a clarified and homogenized molten glass was flowed out at a constant flow rate from an outflow pipe and was received with a lower die for press molding, and the molten glass having been flowed out was cut with a cutting blade so that a predetermined amount of molten glass lump was able to be obtained on the lower die. Then, the lower die holding the molten glass lump was immediately taken out from the lower position of the pipe and was press-molded into a thin-walled disk shape having a diameter of 99 mm and a thickness of 0.7 mm, through the use of an upper die facing the lower die and a drum die. The press-molded product was cooled to temperatures not causing the product to change shape, and then it was taken out from the die and annealed to give a substrate blank (amorphous oxide glass). Note that, in the above-described molding, a plurality of lower dies were used for molding the molten glass having been flowed out into disk-shaped substrate blanks one after another.

(Method B)

With regard to a glass having a composition shown in Table 1, a clarified and homogenized molten glass was continuously cast from above into a heat resistant mold provided with a tubular through hole via the through hole, and the molten glass was then molded into a round column and was taken out from the lower side of the through hole. The taken-out glass was annealed and was then sliced at fixed intervals in the direction perpendicular to the round columnar axis through the use of a multi wire saw to thereby produce disk-shaped substrate blanks (amorphous oxide glass).

Note that, although the above-described methods A and B were employed in this example, methods C and D below are also suitable as a method for manufacturing a disk-shaped substrate blank. Also, methods C and D below are also suitable as a method for manufacturing a glass blank for producing a glass spacer for a magnetic recording/reproducing device.

(Method C)

It is also possible to obtain a substrate blank (amorphous oxide glass) by: allowing the molten glass to flow out onto a float bath; molding the same into a sheet-shaped glass (molding by a float method); subsequently annealing the same; and then boring a disk-shaped glass from the sheet glass.

(Method D)

It is also possible to obtain a substrate blank (amorphous oxide glass) by: molding the molten glass into a sheet-shaped glass, using an overflow down-draw method (fusion method); annealing the same; and then boring a disk-shaped glass from the sheet glass.

(2) Production of Glass Substrate

A through hole was bored in the center of the substrate blank (amorphous oxide glass) obtained using each of the above-described methods, and then grinding processing was then performed on an outer circumferential surface and an inner circumferential surface of the resulting substrate blank. Then, the main surface of the disk was subjected to lapping and polishing (mirror polishing processing) and thereby the disk was finished into a glass substrate for a magnetic disk, having a diameter of 97 mm and a thickness of 0.5 mm. It is also possible to finish a glass blank for producing a glass spacer for a magnetic recording/reproducing device into a glass spacer for a magnetic recording/reproducing device, using the same method.

The glass substrate obtained in the above was cleaned through the use of a 1.7 mass % aqueous solution of hydrofluorosilicic acid ($H_2SiF$), subsequently through the use of a 1 mass % aqueous solution of potassium hydroxide, and the glass substrate was then rinsed with pure water and dried. In magnification observation of the surface of the substrate produced from the glass in Examples, surface roughness and the like were not recognized and the surface was smooth.

Production of Magnetic Recording Medium (Magnetic Disk)

Using the following methods, an adhesive layer, an undercoat layer, a magnetic recording layer, a protecting layer, and a lubricating layer were formed in that order on the main surface of a glass substrate for a magnetic disk produced.

First, through the use of an evacuated film formation apparatus, an adhesive layer, an undercoat layer, and a magnetic recording layer were sequentially formed using a DC magnetron sputtering method in an Ar atmosphere.

At this time, the adhesive layer was formed through the use of a CrTi target so as to give an amorphous CrTi layer having a thickness of 20 nm. Furthermore, a layer that was made of MgO and had a thickness of 10 nm was formed as an undercoat layer. Furthermore, a magnetic recording layer was formed at a film formation temperature of 200° C. to 400° C. through the use of an FePtC or CoPtC target so as to give an FePt granular layer or a CoPt granular layer having a thickness of 10 nm.

A magnetic disk, in which film formation up to the magnetic recording layer had been finished, was moved from the film formation apparatus into a heating furnace to thereby be subjected to annealing. The temperature in the heating furnace in annealing was set in a range of 500° C. to 700° C. Magnetic particles made of a CoPt-based alloy or an FePt-based alloy having an $L_{10}$ ordered structure were formed through this annealing process. Note that there is no limitation thereto, and heating need only be performed to realize an $L_{10}$ ordered structure.

Then, a 3 nm protecting layer made of hydrogenated carbon was formed using a CVD method using ethylene as material gas. After that, a lubricating layer was formed using PFPE (perfluoropolyether) and using a dip coating method. The thickness of the lubricating layer was 1 nm.

A magnetic disk was obtained by the above-described manufacturing process. The obtained magnetic disk was mounted on a hard disk drive provided with a DFH mechanism and magnetic signals were recorded with a recording density of 1000 gigabits per 1 square inch in a recording region on the main surface of the magnetic disk, and were reproduced. At this time, a phenomenon (crash failure), in which a magnetic head and a magnetic disk surface collide with each other, was not confirmed.

Also, a glass spacer obtained by forming an NiP alloy-conductive film on a surface of the glass spacer obtained through the above-described manufacturing process with the use of glass having a composition shown in Table 1 (a glass spacer provided with an NiP-alloy film) was mounted on a hard disk drive provided with a DFH mechanism, and magnetic signals were recorded with a recording density of 1000 gigabits per 1 square inch in a recording region on the main surface of a magnetic disk, which was separately prepared using a substrate made of a material that is different from that of glass according to an aspect of the present invention, and were reproduced. At this time, a phenomenon (crash failure), in which a magnetic head and a magnetic disk surface collide with each other, was not confirmed.

Also, the magnetic disk that was manufactured above and the glass spacer provided with the NiP-alloy film that was manufactured above, using the same glass material according an aspect of the present invention were mounted on a hard disk drive provided with a DFH mechanism, and magnetic signals were recorded with a recording density of 1000 gigabits per 1 square inch in a recording region on the main surface of the magnetic disk, and were reproduced. At this time, a phenomenon (crash failure), in which a magnetic head and a magnetic disk surface collide with each other, was not confirmed. Here, the glass substrate included in the above-described magnetic disk and the above-described glass spacer were made of the same glass material, and thus phenomena that may occur due to the above-described difference in the thermal expansion coefficient do not occur.

According to an aspect of the present invention, it is possible to provide a magnetic recording medium suitable for high-density recording.

Finally, the aforementioned respective aspects are summarized.

According to an aspect, provided is a glass for a magnetic recording medium substrate or for a glass spacer for a magnetic recording/reproducing device, the glass being an amorphous glass containing at least $Li_2O$, in which a total content of $Na_2O$ and $K_2O$ is 0 mol % or more and 6.0 mol % or less, a $B_2O_3$ content is 0 mol % or more and 10.0 mol % or less, and a CaO content is 0 mol % or more and 1.0 mol % or less.

The glass may have high rigidity.

In an embodiment, the CaO content in the glass may be 0 mol % or more and 0.5 mol % or less.

In an embodiment, the CaO content in the glass may be 0 mol % or more and 0.1 mol % or less.

In an embodiment, the glass may be a glass that does not contain CaO.

In an embodiment, the $B_2O_3$ content in the glass may be 0.1 mol % or more and 10.0 mol % or less.

In an embodiment, a $SiO_2$ content in the glass may be 50.0 mol % or more and 70.0 mol % or less.

In an embodiment, a $SiO_2$ content in the glass may be 55.0 mol % or more and 68.0 mol % or less.

In an embodiment, a $Li_2O$ content in the glass may be 1.0 mol % or more and 10.0 mol % or less.

In an embodiment, a $Li_2O$ content in the glass may be 3.0 mol % or more and 6.0 mol % or less.

In an embodiment, the glass may be a glass that does not contain any alkali metal oxide other than $Li_2O$.

In an embodiment, an $Al_2O_3$ content in the glass may be 10.0 mol % or more and 20.0 mol % or less.

In an embodiment, an $Al_2O_3$ content in the glass may be 10.0 mol % or more and 17.0 mol % or less.

In an embodiment, a MgO content in the glass may be 10.0 mol % or more and 25.0 mol % or less.

In an embodiment, the glass may further contain an oxide of one or more types of metals selected from the group consisting of Zr, Y, La, Ti, Hf, Cu, Co, Mn, Nd, Pr, Nb, V, Cr, Ni, Mo, Ho, and Er.

In an embodiment, the glass may have a specific elastic modulus of 35.0 MNm/kg or more.

According to an aspect, provided is a magnetic recording medium substrate made of the above-described glass.

According to an aspect, provided is a magnetic recording medium including: the above-described magnetic recording medium substrate; and a magnetic recording layer.

According to an aspect, a glass spacer for a magnetic recording/reproducing device made of the glass is provided.

According to an aspect, provided is a magnetic recording/reproducing device including one or more selected from the group consisting of the magnetic recording medium and the glass spacer for a magnetic recording/reproducing device.

It should be considered that all the embodiments disclosed this time are exemplifications in all respects and are not restrictive ones. It is intended that the scope of the present invention is shown not by the above explanations but by the claims, and that all changes in equivalent meanings and ranges to the scope of the claims are included.

By subjecting the glass composition exemplified above to the composition adjustment described in this specification, a glass for a magnetic recording medium substrate and a glass spacer for a magnetic recording/reproducing device according to respective aspects of the present invention can be produced, for example.

Furthermore, it is possible, needless to say, to combine arbitrarily equal to or more than 2 items exemplified or described as preferable ranges in the specification.

The invention claimed is:

1. A glass for a magnetic recording medium substrate or for a glass spacer for a magnetic recording/reproducing device, the glass being an amorphous glass, wherein a $Li_2O$ content is 2.5 mol % or more and 6.0 mol % or less, a total content of $Na_2O$ and $K_2O$ is 0 mol %, a $B_2O_3$ content is 0 mol % or more and 1.0 mol % or less, a CaO content is 0 mol % or more and 0.1 mol % or less, a MgO content is 19.2 mol % or more and 23.0 mol % or less, a $TiO_2$ content is 0 mol %, a $SiO_2$ content is more than 56.0 mol % and 65.0 mol % or less, an $Al_2O_3$ content is more than 13.0 mol % and 15.0 mol % or less, a $Y_2O_3$ content is 0 mol %, an average linear expansion coefficient within a temperature range of 100° C. to 300° C. of the glass is $38.4\times10^{-7}$/° C. or more and $52.5\times10^{-7}$/° C. or less, a glass transition temperature Tg of the glass is 697° C. or more and 745° C. or less, a Young's modulus of the glass is 95.9 GPa or more and 100.1 GPa or less, and a specific elastic modulus of the glass is 38.2 MNm/kg or more and 38.8 MNm/kg or less.

2. The glass according to claim 1, wherein the $B_2O_3$ content is 0.1 mol % or more and 0.5 mol % or less.

3. A magnetic recording medium substrate made of the glass according to claim 2.

4. A magnetic recording medium comprising:

the magnetic recording medium substrate according to claim 3; and a magnetic recording layer.

5. A magnetic recording/reproducing device comprising the magnetic recording medium according to claim 4.

6. The glass according to claim 2, wherein the glass does not contain any alkali metal oxide other than $Li_2O$.

7. A magnetic recording medium substrate made of the glass according to claim 6.

8. A magnetic recording medium comprising:

the magnetic recording medium substrate according to claim 7; and a magnetic recording layer.

9. A magnetic recording/reproducing device comprising the magnetic recording medium according to claim 8.

10. The glass according to claim 1, wherein the glass does not contain any alkali metal oxide other than $Li_2O$.

11. A magnetic recording medium substrate made of the glass according to claim 10.

12. A magnetic recording medium comprising:

the magnetic recording medium substrate according to claim 11; and a magnetic recording layer.

13. A magnetic recording/reproducing device comprising the magnetic recording medium according to claim 12.

14. A magnetic recording medium substrate made of the glass according to claim 1.

15. A magnetic recording medium comprising:

the magnetic recording medium substrate according to claim 14; and a magnetic recording layer.

16. A magnetic recording/reproducing device comprising the magnetic recording medium according to claim 15.

17. The glass according to claim 1, wherein the average linear expansion coefficient within the temperature range of 100° C. to 300° C. of the glass is $46.9\times10^{-7}$/° C. or less.

18. The glass according to claim 1, wherein the average linear expansion coefficient within the temperature range of 100° C. to 300° C. of the glass is $46.5\times10^{-7}$/° C. or less.

19. The glass according to claim 1, wherein the average linear expansion coefficient within the temperature range of 100° C. to 300° C. of the glass is $46.3\times10^{-7}$/° C. or less.

* * * * *